(12) United States Patent  
Schaper (10) Patent No.: US 7,373,605 B2  
(45) Date of Patent: May 13, 2008

(54) PRESENTATION SYSTEM FOR DISPLAYING DATA

(75) Inventor: Joachim Schaper, Landau/Pfalz (DE)

(73) Assignee: SAP Aktiengesellschaft (DE)

( * ) Notice: Subject to any disclaimer, the term of this patent is extended or adjusted under 35 U.S.C. 154(b) by 824 days.

(21) Appl. No.: 10/461,877

(22) Filed: Jun. 13, 2003

(65) Prior Publication Data

US 2004/0252074 A1   Dec. 16, 2004

(51) Int. Cl.
G06F 3/00 (2006.01)
(52) U.S. Cl. .................. 715/730; 345/1.1; 715/761
(58) Field of Classification Search ............ 715/761, 715/730; 345/1.1, 1.4
See application file for complete search history.

(56) References Cited

U.S. PATENT DOCUMENTS

| | | | |
|---|---|---|---|
| 5,835,090 A * | 11/1998 | Clark et al. ............... | 715/764 |
| 6,091,408 A * | 7/2000 | Treibitz et al. ............ | 715/753 |
| 6,330,597 B2 * | 12/2001 | Collin et al. .............. | 709/220 |
| 6,657,543 B1 * | 12/2003 | Chung .................... | 340/573.1 |
| 6,943,752 B2 * | 9/2005 | Masumoto et al. ........ | 345/1.1 |
| 7,058,891 B2 * | 6/2006 | O'Neal et al. ............ | 715/730 |
| 7,113,088 B2 * | 9/2006 | Frick et al. ............. | 340/539.11 |
| 2002/0067318 A1 * | 6/2002 | Matsuzaki et al. ......... | 345/1.1 |
| 2003/0048291 A1 * | 3/2003 | Dieberger ................ | 345/732 |
| 2003/0179154 A1 * | 9/2003 | Demsky et al. ........... | 345/1.1 |
| 2004/0168149 A1 * | 8/2004 | Nirell et al. ............. | 717/105 |
| 2005/0044126 A1 * | 2/2005 | Oogaki et al. ............ | 709/200 |

OTHER PUBLICATIONS

Zubair Alexander, "Using Windows 2000's Multiple Monitor Functionality", Nov. 8, 1999, www.windowsitpro.com.*

* cited by examiner

Primary Examiner—Weilun Lo
Assistant Examiner—Sara Hanne
(74) Attorney, Agent, or Firm—Fish & Richardson P.C.

(57) ABSTRACT

A method of displaying data includes defining a primary display screen having a data display area and at least one linking area. At least one secondary display screen is also defined. At least one of the linking areas is associated with at least one of the secondary display screens.

29 Claims, 6 Drawing Sheets

PRESENTATION SYSTEM FOR DISPLAYING DATA

BACKGROUND

Computer systems are often used during business presentations. Typically, slides that include information organized into charts, spreadsheets, documents, and photographs, for example, are presented on a computer monitor or projected onto a display screen. During the presentation, it is often desirable to refer back to a previously presented slide, thus requiring the presenter to sequentially scroll or toggle backwards until the previous slide is redisplayed.

While multiple monitor computer systems allow for the simultaneous presentation of multiple slides, navigating a multiple monitor system is often difficult and non-intuitive, as the individual display areas of each monitor are simply interconnected end-to-end. Therefore, if a computer system includes three monitors and the user is running the slide show on the first monitor and wants to display a slide on the third monitor, the user must drag the slide through the display area of the second monitor prior to positioning it within the display area of the third monitor.

SUMMARY OF THE INVENTION

In one general aspect, a method of displaying data includes defining a primary display screen having a data display area and at least one linking area. At least one secondary display screen is also defined. At least one of the linking areas is associated with at least one of the secondary display screens.

Implementations may include one or more of the following features. Data may be displayed within the data display area of the primary display screen. A portion of the data displayed on the data display area may be associated with a chosen linking area selected from the at least one linking area. The portion of data associated with the chosen linking area may be displayed on a secondary display screen associated with the chosen linking area.

Multiple portions of data may be sequentially displayed on the secondary display screen. A log file concerning the portions of data sequentially displayed on the secondary display screen may be maintained. Portions of data previously displayed on the secondary display screen may be selectively redisplayed.

A first portion of data may be displayed on a first secondary display screen, and a second portion of data may be displayed on a second secondary display screen. The second portion of data may be redisplayed on the first secondary display screen.

Associating a portion of the data displayed may include selecting the portion of data, and either dragging the portion of data into the chosen linking area or selecting the chosen linking area.

The portion of data displayed may be a data window. At least one of the linking areas may be a defined portion of the primary display screen, or a button about a periphery of the data display area. At least one secondary display screen may be a computer monitor. The primary display screen may be a pressure sensitive monitor. A transparent planar surface may be affixed to the pressure sensitive monitor with load cells, such that the load cells provide a location signal indicative of a user-selectable portion of the data display area. A unique identifier, contained within a radio-frequency identifier worn by a user, may be sensed and associated with a user profile associated with the user.

The above-described method may also be implemented as a sequence of instructions executed by a processor.

The implementations can provide one or more of the following advantages. By allowing a user to quickly and easily move data between the primary display and several secondary displays, presentation efficiency is enhanced. Further, as the user is able to intuitively move the data between displays, any leaning curve is reduced. Additionally, by automatically identifying the user of the system, the user manipulating the data can be automatically identified.

The details of one or more implementations are set forth in the accompanying drawings and the description below. Other feature's and advantages will become apparent from the description, the drawings, and the claims.

DETAILED DESCRIPTION

Figure 1:
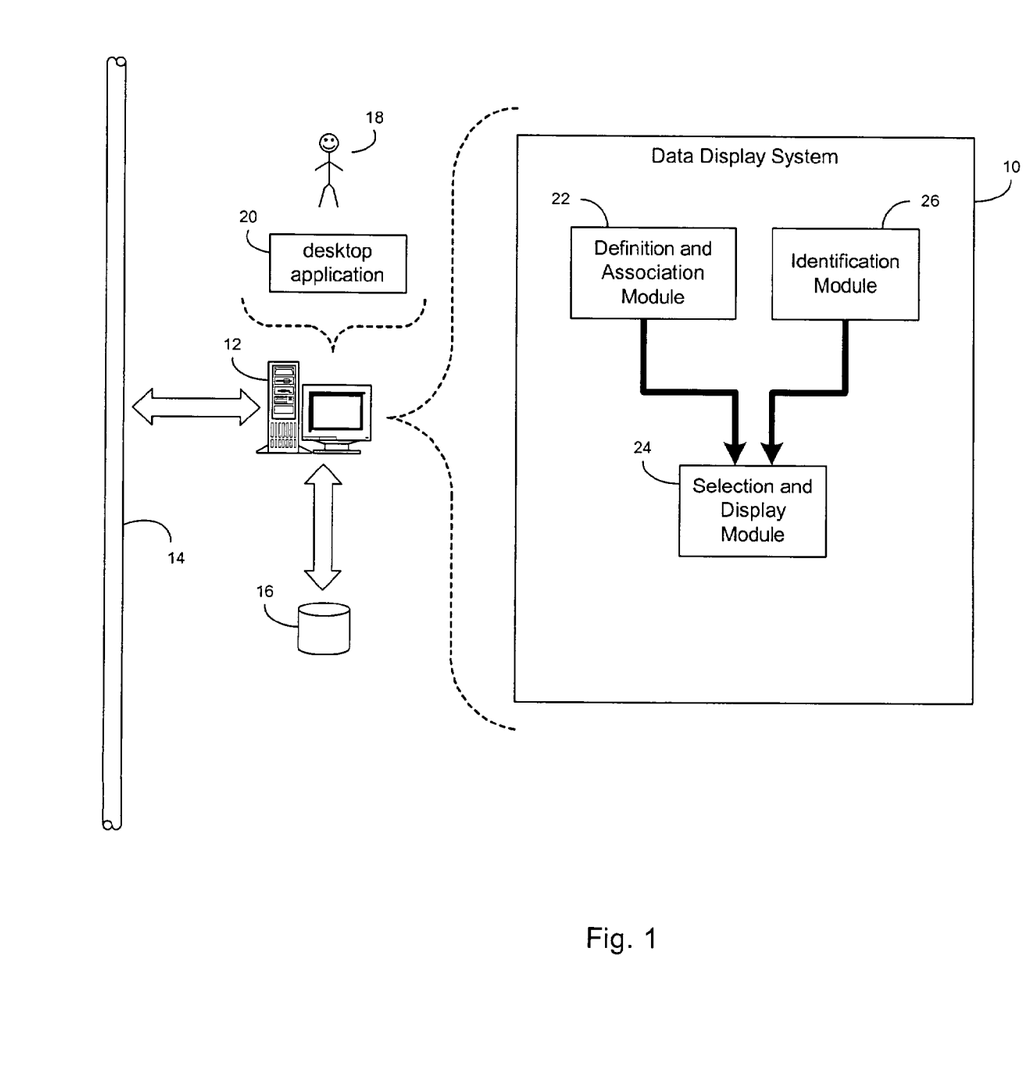
FIG. 1 is a block diagram of a data display system.

Referring to FIG. 1, a data display system 10 is shown that allows a user to manipulate and display data across multiple display screens.

The display system 10 typically resides on and is executed by one or more computers (e.g., computer 12) that may be connected to a network 14 (e.g., the Internet, an intranet, a local area network, or some other form of data communication network). The instruction sets and subroutines forming the software of the data display system 10 are typically stored on a storage device 16 connected to computer 12.

Storage device 16 may be, for example, a hard disk, drive, a tape drive, an optical drive, a RAID array, a random access memory (RAM), or a read-only memory (ROM). A user 18 typically accesses, administers, and uses data display system 10 through a desktop application or operating system 20 (e.g., Microsoft Windows™, UNIX™, or a specialized operating system) running on the computer 12.

Figure 2:
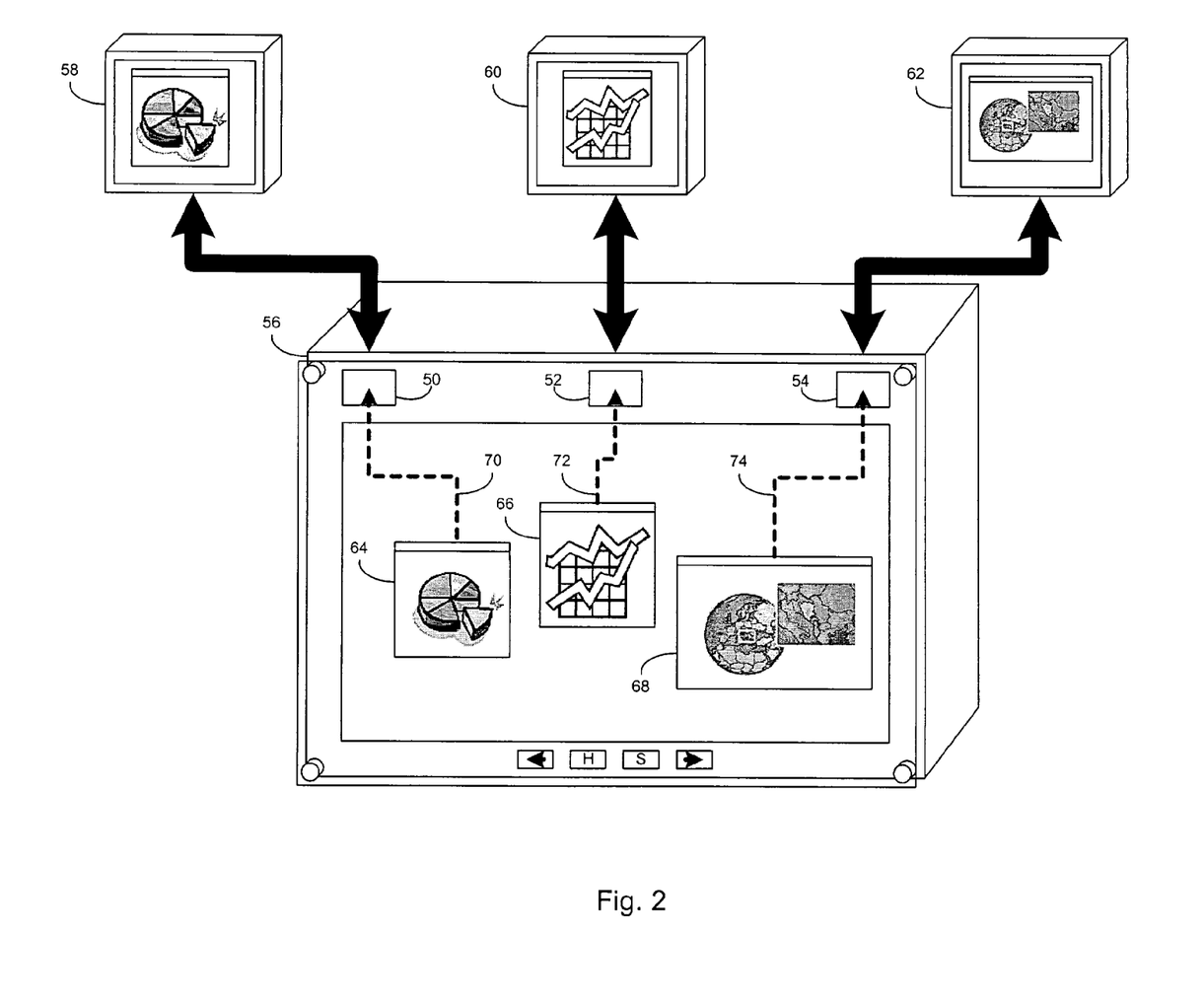
FIG. 2 is a block diagram of the display screens of the data display system of FIG. 1.

The display system 10 typically includes three modules, a definition and association module 22, a selection and display module 24, and an identification module 26, each of which will be discussed below in detail. Referring also to FIG. 2, the definition and selection module 22 associates various linking areas (e.g. linking areas 50, 52, and 54) on a primary display screen 56 with individual secondary display screens (e.g., secondary display screens 58, 60, 62). The selection and display module 24 allows a user to select various portions of data (e.g., pie chart 64, line chart 66, and map 68) displayed on the primary display screen 56 and move and/or copy them onto one or more secondary display screens (e.g., secondary display screens 58, 60, and 62 respectively). This movement of data between screens occurs when the user drags (as represented by arrows 70, 72, and 74, respectively) the selected portion of data to the appropriate linking area (linking areas 50, 52, and 54, respectively) that is associated with the target secondary display screen (secondary display screens 58, 60, and 62, respectively). The identification module 26 automatically identifies the user who is manipulating the data.

Figure 3:
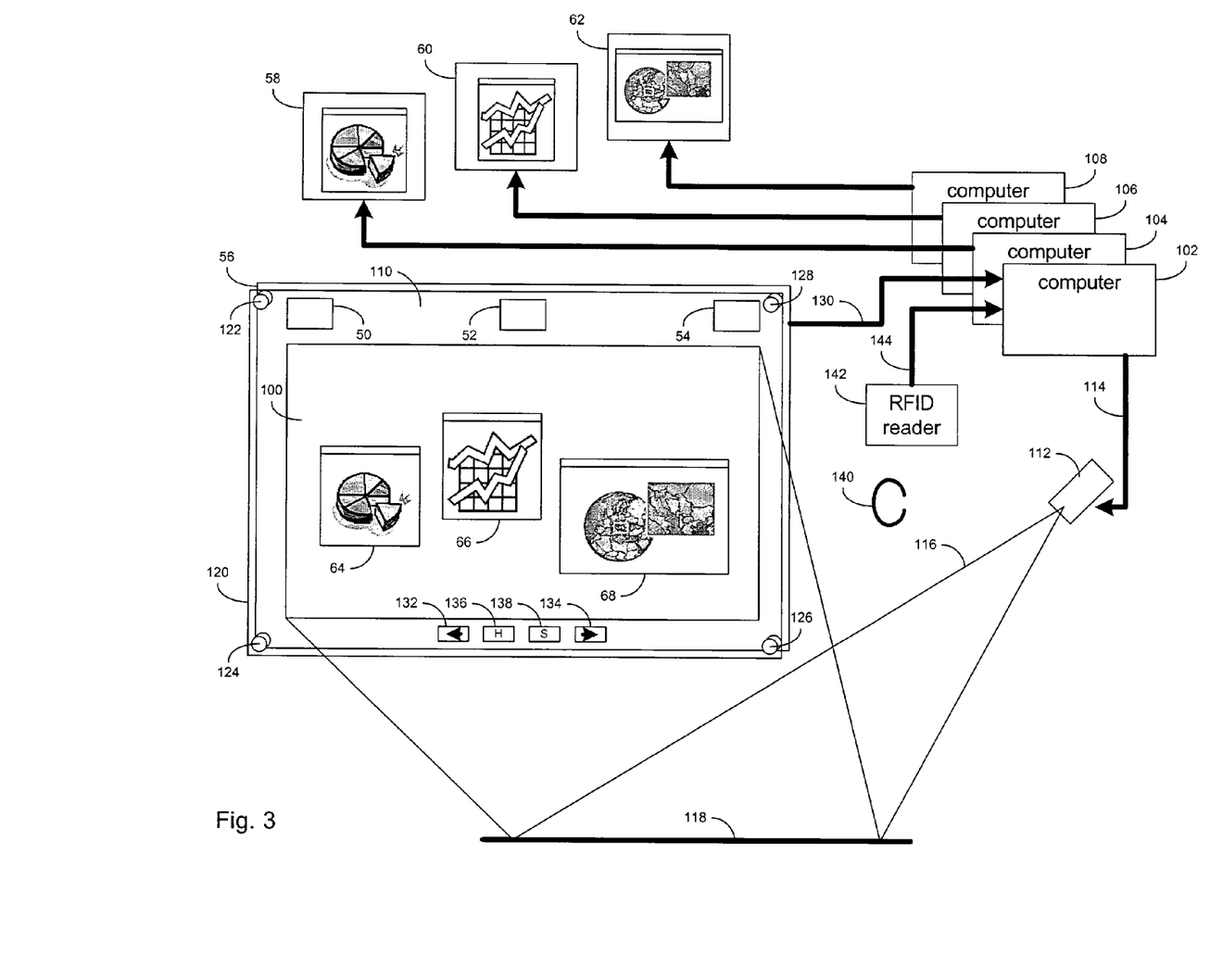
FIG. 3 is a block diagram showing additional details of the data display system of FIG. 1.
Figure 4:
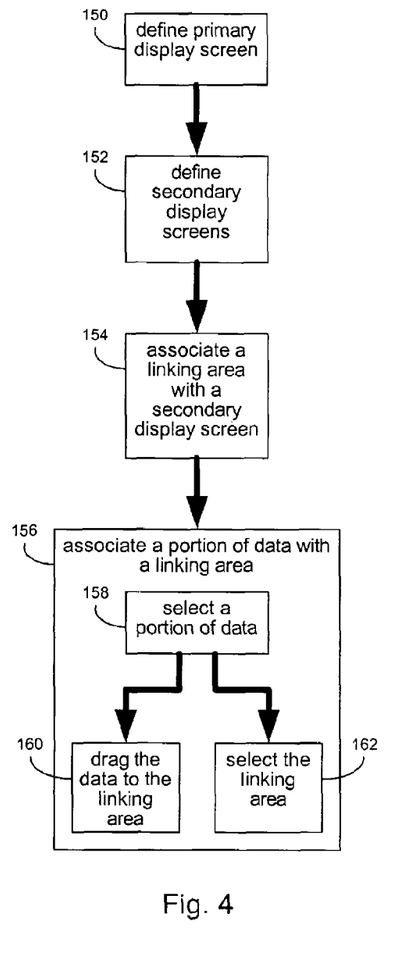
FIG. 4 is a flow diagram of a definition and association module of the data display system of FIG. 1.

Referring to FIGS. 3 and 4, the process implemented by the definition and association module 22 is shown in greater detail. Specifically, the definition and association module 22 defines (150) the primary display screen 56, which includes a data display area 100 and multiple linking areas 50, 52, and 54. Further, the definition and association module 22 also defines (152) one or more secondary display screens 58, 60, and 62. Typically, the primary display screen 56 and each of the secondary display screens 58, 60, and 62 are driven by an individual computer 102, 104, 106, and 108, respectively. Computers 102, 104, 106, and 108 are typically interconnected with a network (not shown), such as a wireless network (e.g., an IEEE 802.11a or 802.11b network), a hardwired network (e.g., an Ethernet network), a serial cable network, or a parallel cable network.

The number of linking areas 50, 52, and 54 is typically equal to the number of secondary display screens 58, 60, and 62, such that each of the linking areas is associated (154) with (and mapped to) a secondary display screen by the definition and associate module 22.

Data, such as pie chart 64, line chart 66; and map 68, is displayed within the data display area 100. Other types of data (not shown) may include various data windows generated by the operating system 20, such as web pages, word processing documents, spreadsheets, databases, photographs, and programming editor screens, for example. During use, the user of the data display system 10 accesses and displays various pieces of data within display area 100 of primary display screen 56. The user may then choose to move or copy selected pieces of data to the various secondary display screens 58, 60, and 62.

Typically, primary display screen 56 is a pressure sensitive device that allows the user to directly manipulate and move the data, as opposed to manipulating and moving the data with a pointing device, such as a mouse. Accordingly, when a user chooses to display a portion of data (currently displayed within data display area 100) on one of the secondary display screens, the user associates (156) the selected portion of data with a linking area associated with the secondary display screen selected by the user. To accomplish this association 156, the user typically touches the screen (in an area proximate the data) to select (158) the desired portion of data. Once the selection is made, the user may then drag (160) the data (i.e., slide their hand or finger while maintaining contact with the screen) to one of the linking areas 50, 52, or 54. Alternatively, a sequence of taps may be used. For example, the user may tap the data to select (158) the desired portion of data. The user may then select (162) (by tapping) the appropriate linking area associated with the secondary display screen on which the uses chooses to display the data. Either one of these procedures associates (156) the portion of data selected by the user with the linking area selected by the user. As will be discussed below in greater detail, this results in the selected portion of data being displayed on the secondary display screen associated with the linking area selected by the user.

As primary display screen 56 is a pressure sensitive device, the primary display screen 56 operates as a rear projection-type monitor in conjunction with a planar surface 120, which includes the (transparent) data display area 100 that is typically backlit. Linking areas 50, 52, and 54 are positioned within an opaque non-backlit area 110 located about the periphery of the data display area 100 on the planar surface 120. Additionally, linking areas 50, 52, and 54 are typically a defined portion of the non-backlit area 110. The secondary display screens are typically general purpose computer monitors, such as cathode ray tube (CRT) based monitors, flat-panel liquid crystal display (LCD) monitors, and flat-panel plasma displays.

Computer 102 (i.e., the computer driving the image for primary display screen 56) is connected to and provides a video signal to an LCD projector 112 that converts the video signal 114 provided by computer 102 into a projected image 116. This projected image 116 is reflected by mirror 118 onto the rear surface of data display area 100.

As stated above, primary display screen 56 is a pressure sensitive monitor that shares similar characteristics with a touch pad style pointing device. While a typical "touch screen" type system may be used, in the preferred implementation, primary display screen 56 includes the transparent planar surface 120 (e.g., a sheet of clear tempered glass) affixed to the front surface of primary display system 56 with several load cells 122, 124, 126, and 128. Typically, four load cells are utilized, one at each corner of planar surface 120.

By monitoring the load signal produced by each load cell 122, 124, 126, and 128, the location of the planar surface 120 that the user is touching can be identified. For example, if a user applies pressure at the geometric center of planar surface 120, the load signal provided by each of the load cells is essentially equal. As the user moves their hand (e.g., while dragging a portion of data into a linking area) across the surface of planar surface 120, the individual load signals provided by each load cell will vary. Therefore, by monitoring the value of the load signals provided by each of the load cells, the movement of the user's hand across the planar surface 120 can be tracked. These individual load signals are processed to generate a location signal 130 that is provided to computer 102 and is indicative of the position of the force being applied to planar surface 120. As planar surface 120 is rigidly positioned with respect to data display area 100, the position and movement of the user's hand on planar surface 120 can be superimposed onto the data display area 100 of primary display screen 56, in a similar fashion to the manner in which a mouse pointer is controlled within an operating system 20.

Figure 5:
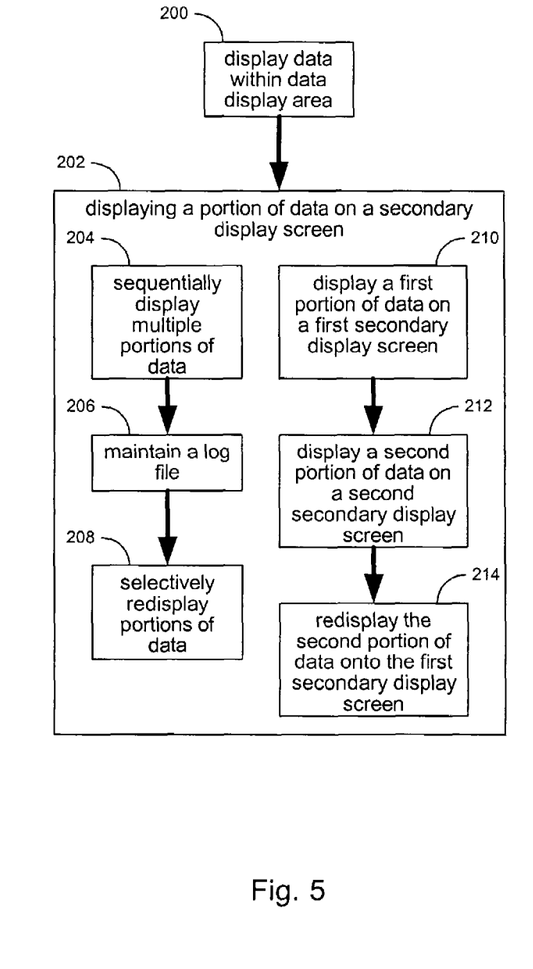
FIG. 5 is a flow diagram of a selection and display module of the data display system of FIG. 1.

Referring to FIGS. 3 and 5, the selection and display module 24 displays (200) the various pieces of data (e.g., data 64, 66, and 68) within data display area 100 of primary display screen 56. Further, selection and display module 24, which is responsive to the user associating (156) (see FIG. 4) a portion of the data with a linking area, displays (202) that portion of data on the secondary display device associated with the chosen linking area.

As stated above, each time a portion of data is selected and subsequently associated with (e.g., dragged into) a linking area, the second display screen associated with that linking area displays the selected portion of data. This association of data may occur multiple times for a single linking area and, therefore, a single secondary display monitor. This results in the image displayed on the secondary display area being updated.

Further, each time a new portion of data is subsequently displayed (204) on a secondary display screen, the old portion of data previously displayed on that screen is overwritten. A log file (not shown) is maintained (206) this itemizes the history of the portions of data currently and previously displayed on each secondary display screen. Additionally, each portion of data currently or previously displayed on each secondary display screen is stored on one or more of the computers (e.g., computers 102, 104, 106, and 108) incorporated into the data display system, thus allowing for later retrieval of the data.

Accordingly, the combination of the log file and the currently and previously displayed portions of data stored on the computers allows the user to selectively redisplay (208) portions of data that were previously displayed on a secondary display screen.

To facilitate this redisplaying of data, primary display screen 56 includes several user-accessible buttons 132, 134, 136, and 138 which are typically positioned in the non-backlit area 110 of primary display screen 56. These buttons may be physical buttons or software buttons (i.e., defined regions of space on a pressure sensitive screen).

This redisplaying of data may be accomplished in various ways. For example, in this particular implementation, there are four buttons: a backward button 132, a forward button 134, a history button 136, and a scroll button 138 (to be discussed below in greater detail).

If a user wishes to redisplay a portion of data that was previously displayed on a secondary display screen, the user typically selects the history button 136 and then selects the secondary display screen for which they would like to see the display history. The selection of the secondary display screen may be accomplished by touching the linking area associated with the desired secondary display screen. This, in turn, results in the computer associated with the secondary display screen accessing the log file for the particular secondary display screen selected by the user. Once accessed, the user may toggle through the various portions of data currently and previously displayed on the selected secondary display screen through the use of the backward and forward buttons (132 and 134 respectively), with functionality similar to that of the forward and backward buttons of a web browser application.

In addition to the toggling of images on a single secondary display screen, the images may also be toggled between screens. As discussed above, selection and display module 24 allows a user to display (210) a first portion of data on a first secondary display screen (e.g., screen 58) while displaying (212) a second portion of data of a second secondary display screen (e.g., screen 60). Additionally, the user may then redisplay (214) (via selection and display module 24) the second portion of data (currently displayed on the second secondary display screen) on the first secondary display screen.

As an example, the images displayed on the secondary display screens may be shifted, such that: the pie chart displayed on secondary display 58 is moved to secondary display screen 60; the line chart displayed on secondary display screen 60 is moved to secondary display screen 62; and the map displayed on secondary display screen 62 is moved to secondary display screen 58. Alternatively, instead of "looping" the map of secondary display screen 62 back to secondary display screen 58, the map may simply not be displayed, resulting in secondary display screen 58 having a blank image (not shown).

To accomplish this shifting of images in this particular implementation, the user typically selects the scroll button 138 and uses the backward button 132 to shift the images to the left, or the forward button 134 to shift the images to the right.

Figure 6:
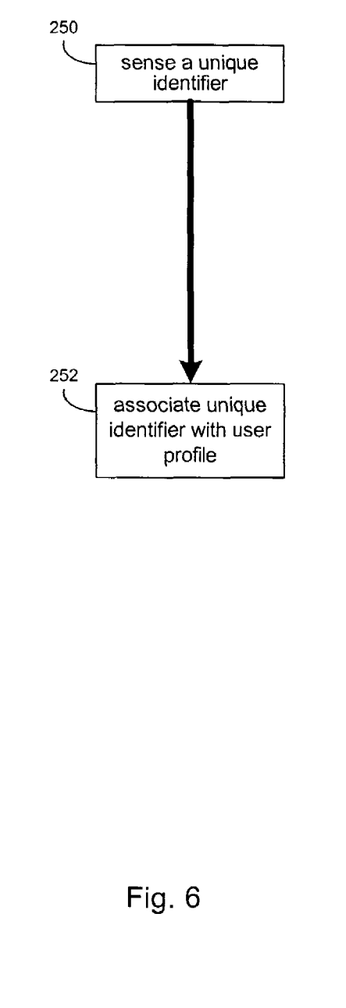
FIG. 6 is a flow diagram of an identification module of the data display system of FIG. 1.

Referring to FIGS. 3 and 6, the identification module 26 senses (250) a unique identifier contained within a radio-frequency identifier (e.g., RFID bracelet 140) worn by the user of the data presentation system. This unique identifier is sensed by an RFID reader 142, which provides an identification signal 144 to the computer 102 driving primary display screen 56. Identification module 26 associates (252) identification signal 144 with a user profile associated with the user operating the data display system 10. Therefore, since RFID reader 142 is positioned proximate the data display area 100 of primary display screen 56, and bracelet 140 is worn on the wrist of the user, whenever the user moves their hand near planar surface 120, the identity of the user manipulating the data is determined. This enables multiple users (each wearing a bracelet with a unique RFID tag) to simultaneously use the data display system, such that each time a portion of data on the data display area is moved, the identify of the user moving that portion of data is known.

While the above-described system is shown to include three secondary display screens, the actual number of secondary display screen utilized may be adjusted to accommodate the requirements of the intended user.

While the linking areas are described above as being defined portions of the non-backlit area 110, other configurations are possible. For example, the linking areas may be physical buttons that are depressed once the user selects the desired portion of data.

While the system is described above as including a radio frequency identification (RFID) system, other configurations are possible, such as optical and biometric identification systems.

The system and method described herein is not limited to the implementation described above; it may find applicability in any computing or processing environment. The system and method may be implemented in hardware, software, or a combination of the two. For example, the system and method may be implemented using circuitry, such as one or more of programmable logic (e.g., an ASIC), logic gates, a processor, and a memory.

The system and method may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system and method. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The system and method may also be implemented as a machine-readable storage medium, configured with a computer program, where, upon execution, instructions in the computer program cause a machine to operate to perform the functions of the system and method described above.

Implementations of the system and method may be used in a variety of applications. Although the system and method is not limited in this respect, the system and method may be implemented with memory devices in microcontrollers, general-purpose microprocessors, digital signal processors (DSPs), reduced instruction-set computing (RISC), and complex instruction-set computing (CISC), among other electronic components.

Implementations of the system and method may also use integrated circuit blocks referred to as main memory, cache memory, or other types of memory that store electronic instructions to be executed by a microprocessor or store data that may be used in arithmetic operations.

A number of implementations have been described. Nevertheless, it will be understood that various modifications may be made. Accordingly, other implementations are within the scope of the following claims.

What is claimed is:

1. A method comprising:
defining a primary display screen on a first display device, the primary display screen including a data display area and first and second linking areas;
defining first and second secondary display screens on second and third display devices, respectively;
mapping the first and second linking areas with the first and second secondary display screens, respectively;
displaying first and second slides in the data display area concurrently;
receiving a first user selection dragging the first slide into the first linking area, via the primary display screen;
displaying the first slide in the first secondary display screen on the second display device based upon receiving the first user selection;
receiving a second user selection dragging the second slide into the second linking area, via the primary display screen;
displaying the second slide in the second secondary display screen on the third display device based upon receiving the second user selection, wherein the second slide is displayed in the second secondary display screen on the third display device at the same time as the first slide is displayed in the first secondary display screen on the second display device;
receiving a third user selection of a secondary display screen interface control element that is provided proximate to the primary display screen and that is configured to control display of slides on at least one of the first and second secondary display screens in accordance with a history function or a shift function depending on whether the primary display screen is in a history mode or a shift mode; and
based on receiving the third user selection of the secondary display screen interface control element:
determining whether the primary display screen is in the history mode or the shift mode;
conditioned on determining that the primary display screen is in the history mode, control display of slides on at least one of the first and secondary display screens in accordance with the history function comprising:
accessing from electronic storage, a log file including display history information of slides previously displayed on at least one of the first and second secondary display screens during a current presentation; and
controlling at least one of the first and second secondary display screens to display a slide previously displayed during the current presentation on the corresponding secondary display screen based on the accessed display history information included in the log file; and
conditioned on determining that the primary display screen is in the shift mode, controlling display of slides on at least one of the first and secondary display screens in accordance with the shift function comprising at least one of moving the first slide to the second secondary display screen and moving the second slide to the first secondary display screen.

2. The method of claim 1 wherein:
controlling display of slides on at least one of the first and second secondary display screens in accordance with the shift function comprises:
removing the first slide from the first secondary display screen on the second display device,
removing the second slide from the second secondary display screen on the third display device,
redisplaying the second slide on the first secondary display screen on the second display device, and
maintaining display of the first and second slides in the data display area.

3. The method of claim 1 wherein the first and second linking areas are displayed as buttons around a periphery of the data display area.

4. The method of claim 1 wherein the first secondary display screen is a computer monitor.

5. The method of claim 1 wherein the primary display screen is a pressure sensitive monitor.

6. The method of claim 1 further comprising:
sensing a unique identifier contained within a radio-frequency identifier worn by a user; and
associating the unique identifier with a user profile associated with the user.

7. The method of claim 1, further comprising:
displaying a third slide in the data display area concurrently with displaying the first and second slides;
receiving a third user selection dragging the third slide into the first or second linking area, via the primary display screen;
displaying the third slide in the first secondary display screen based upon the third user selection dragging the third slide into the first linking area, and
displaying the third slide in the second secondary display screen based upon the third user selection dragging the third slide into the second linking area.

8. The method of claim 1, wherein the slide further comprises image organized into a chart, a map, a web page, a word processing document, a spreadsheet, a database, a photograph, or a programming editor screen.

9. The method of claim 1, wherein the first, second and third display devices are different display devices.

10. The method of claim 1, wherein the second and third display devices are disposed in separate physical locations.

11. The method of claim 1 wherein the secondary display screen interface control element is at least one of a physical button and a software button.

12. The method of claim 1 wherein the secondary display screen interface control element is a first secondary display screen interface control element, further comprising:
receiving a fourth user selection of a second secondary display screen interface control element; wherein:
conditioned on determining that the primary display screen is in the shift mode, controlling display of slides on at least one of the first and second secondary display screens in accordance with the shift function comprises:
moving the first slide to the second secondary display screen based on receiving the third user selection, and
moving the second slide to the first secondary display screen based on receiving the fourth user selection.

13. The method of claim 1 wherein:
controlling display of slides on at least one of the first and second secondary display screens in accordance with the history function further comprises:
receiving a fourth user selection indicative of the first secondary display screen, or the second secondary display screen, wherein
accessing, from electronic storage, a log file including display history information of slides previously displayed on at least one of the first and second secondary display screens during a current presentation comprises:
conditioned on the fourth user selection being indicative of the first secondary display screen, accessing, from electronic storage, a first log file including first display history information of slides previously displayed on the first secondary display screen during the current presentation, and
conditioned on the fourth user selection being indicative of the second secondary display screen, accessing, from electronic storage, a second log file including second display history information of slides previously displayed on the second secondary display screen during the current presentation, and
controlling at least one of the first and second secondary display screens to display a slide previously displayed during the current presentation on the corresponding secondary display screen based on the accessed display history information included in the log file comprises:
conditioned on the fourth user selection being indicative of the first secondary display screen, controlling the first secondary display screen to display a slide previously displayed during the current presentation on the first secondary display screen based on the accessed first display history information included in the first log file, and
conditioned on the fourth user selection being indicative of the second secondary display screen, controlling the second secondary display screen to display a slide previously displayed during the current presentation on the second secondary display screen based on the accessed second display history information included in the second log file.

14. The method of claim 13 wherein the first log file is different than the second log file.

15. The method of claim 1 further comprising:
receiving a fourth user selection of a mode interface control element that is provided proximate to the primary display screen; and
based on receiving the fourth user selection, switching the mode of the primary display screen such that the function performed by the secondary display screen interface control element switches.

16. The method of claim 1 further comprising:
receiving a fourth user selection of a history mode interface control element that is provided proximate to the primary display screen;
based on receiving the fourth user selection:
setting the mode of the primary display screen to the history mode, and
configuring the secondary display screen interface control element to perform the history function upon selection;
receiving a fifth user selection of a shift mode interface control element that is provided proximate to the primary display screen;
based on receiving the fifth user selection:
setting the mode of the primary display screen to the shift mode, and configuring the secondary display screen interface control element to perform the shift function upon selection.

17. A computer readable medium, having a plurality of instructions stored thereon, which, when executed by the processor, cause that processor to:
define a primary display screen on a first display device, the primary display screen including a data display area and first and second linking areas;
define first and second secondary display screens on second and third display devices, respectively;
map the first and second linking areas with the first and second secondary display screens, respectively;
display first and second slides in the data display area concurrently;
receive a first user selection dragging the first slide into the first linking area, via the primary display screen;
display the first slide in the first secondary display screen on the second display device based upon receiving the first user selection;
receive a second user selection dragging the second slide into the second linking area, via the primary display screen;
display the second slide in the second secondary display screen on the third display device based upon receiving the second user selection, wherein the second slide is displayed in the second secondary display screen on the third display device at the same time as the first slide is displayed in the first secondary display screen on the second display device;
receive a third user selection of a secondary display screen interface control element that is provided proximate to the primary display screen and that is configured to control display of slides on at least one of the first and second secondary display screens in accordance with a history function or a shift function depending on whether the primary display screen is in a history mode or a shift mode; and
based on receiving the third user selection of the secondary display screen interface control element:
determine whether the primary display screen is in the history mode or the shift mode;
conditioned on determining that the primary display screen is in the history mode, control display of slides on at least one of the first and secondary display screens in accordance with the history function comprising:
accessing from electronic storage, a log file including display history information of slides previously displayed on at least one of the first and second secondary display screens during a current presentation; and
controlling at least one of the first and second secondary display screens to display a slide previously displayed during the current presentation on the corresponding secondary display screen based on the accessed display history information included in the log file; and
conditioned on determining that the primary display screen is in the shift mode, control display of slides on at least one of the first and secondary display screens in accordance with the shift function comprising at least one of moving the first slide to the second secondary display screen and moving the second slide to the first secondary display screen.

18. The computer readable medium of claim 17 wherein:
controlling display of slides on at least one of the first and second secondary display screens in accordance with the shift function comprises:
removing the first slide from the first secondary display screen on the second display device,
removing the second slide from the second secondary display screen on the third display device,
redisplaying the second slide on the first secondary display screen on the second display device, and
maintaining display of the first and second slides in the data display area.

19. The computer readable medium of claim 17 further comprising instructions for:
sensing a unique identifier contained within a radio-frequency identifier worn by a user; and
associating the unique identifier with a user profile associated with the user.

20. A presentation system comprising:
a primary display screen on a first display device, the primary display screen including a data display area and first and second linking areas;
first and second secondary display screens on second and third display devices, respectively; and
a computer program product residing on a computer readable medium having a plurality of instructions stored thereon which, when executed by the processor, cause that processor to:
map the first and second linking areas with the first and second secondary display screens, respectively,
display first and second slides in the data display area concurrently,
receive a first user selection dragging the first slide into the first linking area, via the primary display screen;
display the first slide in the first secondary display screen on the second display device based upon receiving the first user selection;
receive a second user selection dragging the second slide into the second linking area, via the primary display screen;
display the second slide in the second secondary display screen on the third display device based upon receiving the second user selection, wherein the second slide is displayed in the second secondary display screen on the third display device at the same time as the first slide is displayed in the first secondary display screen on the second display device;
receive a third user selection of a secondary display screen interface control element that is provided proximate to the primary display screen and that is configured to control display of slides on at least one of the first and second secondary display screens in accordance with a history function or a shift function depending on whether the primary display screen is in a history mode or a shift mode; and
based on receiving the third user selection of the secondary display screen interface control element:
determine whether the primary display screen is in the history mode or the shift mode;
conditioned on determining that the primary display screen is in the history mode, control display of slides on at least one of the first and secondary display screens in accordance with the history function comprising:
accessing from electronic storage, a log file including display history information of slides previously displayed on at least one of the first and second secondary display screens during a current presentation; and
controlling at least one of the first and second secondary display screens to display a slide previously displayed during the current presentation on the corresponding secondary display screen based on the accessed display history information included in the log file; and
conditioned on determining that the primary display screen is in the shift mode, control display of slides on at least one of the first and secondary display screens in accordance with the shift function comprising at least one of moving the first slide to the second secondary display screen and moving the second slide to the first secondary display screen.

21. The system of claim 20 wherein the first and second linking areas are displayed as buttons around a periphery of the data display area.

22. The system of claim 20 wherein the first secondary display screen is a computer monitor.

23. The system of claim 20 wherein the primary display screen is a pressure sensitive monitor.

24. The system of claim 20 further comprising:
a radio-frequency identification device for sensing a unique identifier contained within a radio-frequency identifier worn by a user;
wherein the computer program product further comprises instructions for:
associating the unique identifier with a user profile associated with the user.

25. A method comprising:
defining a primary display screen on a first display device, the primary display screen including a data display area and first through third linking areas;
defining first through third secondary display screens on second through fourth display devices, respectively;
mapping the first through third linking areas with the first through third secondary display screens, respectively;
displaying first through third slides in the data display area on the primary display screen on the first display device concurrently;
receiving a first user selection dragging the first slide into first linking area, via the primary display screen;
displaying the first slide in the first secondary display screen on the second display device based upon receiving the first user selection;
receiving a second user selection dragging the second slide into the second linking area, via the primary display screen;
displaying the second slide in the second secondary display screen on the third display device based upon receiving the second user selection, wherein the second slide is displayed in the second secondary display screen on the third display device at the same time as the first slide is displayed in the first secondary display screen on the second display device;
receiving a third user selection dragging the third slide into the third linking area, via the primary display screen;
displaying the third slide in the third secondary display screen on the fourth display device based upon receiving the third user selection, wherein the third slide is displayed in the third secondary display screen on the fourth display device at the same time as the first slide is displayed in the first secondary display screen on the second display device and the second slide is displayed in the second secondary display screen on the third display device;

receiving a fourth user selection of a secondary display screen interface control element that is provided proximate to the primary display screen and that is configured to control display of slides on at least one of the first through third secondary display screens in accordance with a history function or a shift function depending on whether the primary display screen is in a history mode or a shift mode; and based on receiving the fourth user selection of the secondary display screen interface control element:

determining whether the primary display screen is in the history mode or the shift mode;

conditioned on determining that the primary display screen is in the history mode, performing a history function by:

receiving a fifth user selection indicative of the first secondary display screen, the second secondary display screen, or the third secondary display screen,         conditioned on the fifth user selection being indicative of the first secondary display screen:

accessing, from electronic storage, a first log file including first secondary display screen history information; and             based on the accessed first secondary display screen history information included in the first log file, controlling the first secondary display screen to display a slide that was displayed on the first secondary display screen prior to a current slide being displayed on the first secondary display screen immediately prior to receiving the fourth user selection,         conditioned on the fifth user selection being indicative of the second secondary display screen:

accessing, from electronic storage, a second log file including second secondary display screen history information; and             based on the accessed second secondary display screen history information included in the second log file, controlling the second secondary display screen to display a slide that was displayed on the second secondary display screen prior to a current slide being displayed on the second secondary display screen immediately prior to receiving the fourth user selection, and         conditioned on the fifth user selection being indicative of the third secondary display screen:

accessing, from electronic storage, a third log file including third secondary display screen history information; and             based on the accessed third secondary display screen history information included in the third log file, controlling the third secondary display screen to display a slide that was displayed on the third secondary display screen prior to a current slide being displayed on the third secondary display screen immediately prior to receiving the fourth user selection; and     conditioned on determining that the primary display screen is in the shift mode, performing a shift function by:

removing the first slide from the first secondary display screen on the second display device,         removing the second slide from the second secondary display screen on the third display device,         removing the third slide from the third secondary display screen on the fourth display device,         redisplaying the second slide on the first secondary display screen on the second display device,         redisplaying the third slide on the second secondary display screen on the third display device, and         maintaining display of the first through third slides in the data display area.

26. The method of claim 25 wherein the first, second, and third log files are different.

27. The method of claim 26 wherein:

first through third computers are configured to control the first through third secondary display screens, respectively, the first through third computers being different;

the first computer is configured to maintain the first log file including the first secondary display screen history information;

the second computer is configured to maintain the second log file including the second secondary display screen history information; and the third computer is configured to maintain the third log file including third secondary display screen history information.

28. The method of claim 25 wherein performing the shift function further comprises:

redisplaying the first slide on the third secondary display screen on the fourth display device.

29. The method of claim 25 wherein performing the shift function further comprises:

blanking the third secondary display screen on the fourth display device.

* * * * *